United States Patent [19]

Momiyama

[11] 4,381,888

[45] May 3, 1983

[54] RETROFOCUS TYPE LARGE APERTURE WIDE ANGLE OBJECTIVE

[75] Inventor: Kikuo Momiyama, Yokohama, Japan

[73] Assignee: Canon Kabushiki Kaisha, Tokyo, Japan

[21] Appl. No.: 272,379

[22] Filed: Jun. 10, 1981

[30] Foreign Application Priority Data

Jun. 11, 1980 [JP] Japan .................................. 55-78704

[51] Int. Cl.³ .......................... G02B 9/64; G02B 13/04
[52] U.S. Cl. .................................................. 350/458
[58] Field of Search ............... 350/458, 462, 459, 460, 350/461

[56] References Cited

U.S. PATENT DOCUMENTS

| | | | |
|---|---|---|---|
| 3,748,021 | 7/1973 | Tajima et al. ......................... | 350/458 |
| 3,877,795 | 4/1975 | Yamashita ............................ | 350/458 |
| 4,310,222 | 1/1982 | Ikemori ................................ | 350/458 |

*Primary Examiner*—John K. Corbin
*Assistant Examiner*—Paul Dzierzynski
*Attorney, Agent, or Firm*—Toren, McGeady and Stanger

[57] ABSTRACT

A wide angle objective of the retrofocus type, with an increased aperture, is disclosed. This objective comprises three lens groups of which the first counting from the front has a negative power and includes, from front to rear, a positive lens in the meniscus form convex toward the front, a negative lens in the meniscus form convex toward the front, a negative lens likewise in the meniscus form convex toward the front, a positive lens, and a negative lens in the meniscus form convex toward the front. The second lens group includes a cemented bi-convex lens, and the third lens group includes a cemented lens of positive and negative lens elements, a positive lens in the meniscus form convex toward the rear, a cemented lens of negative and positive lens elements, and a positive lens. A diaphragm is positioned in the space between the second and third lens groups. Various conditions are prescribed for every lens group, and for every lens in each group.

5 Claims, 15 Drawing Figures

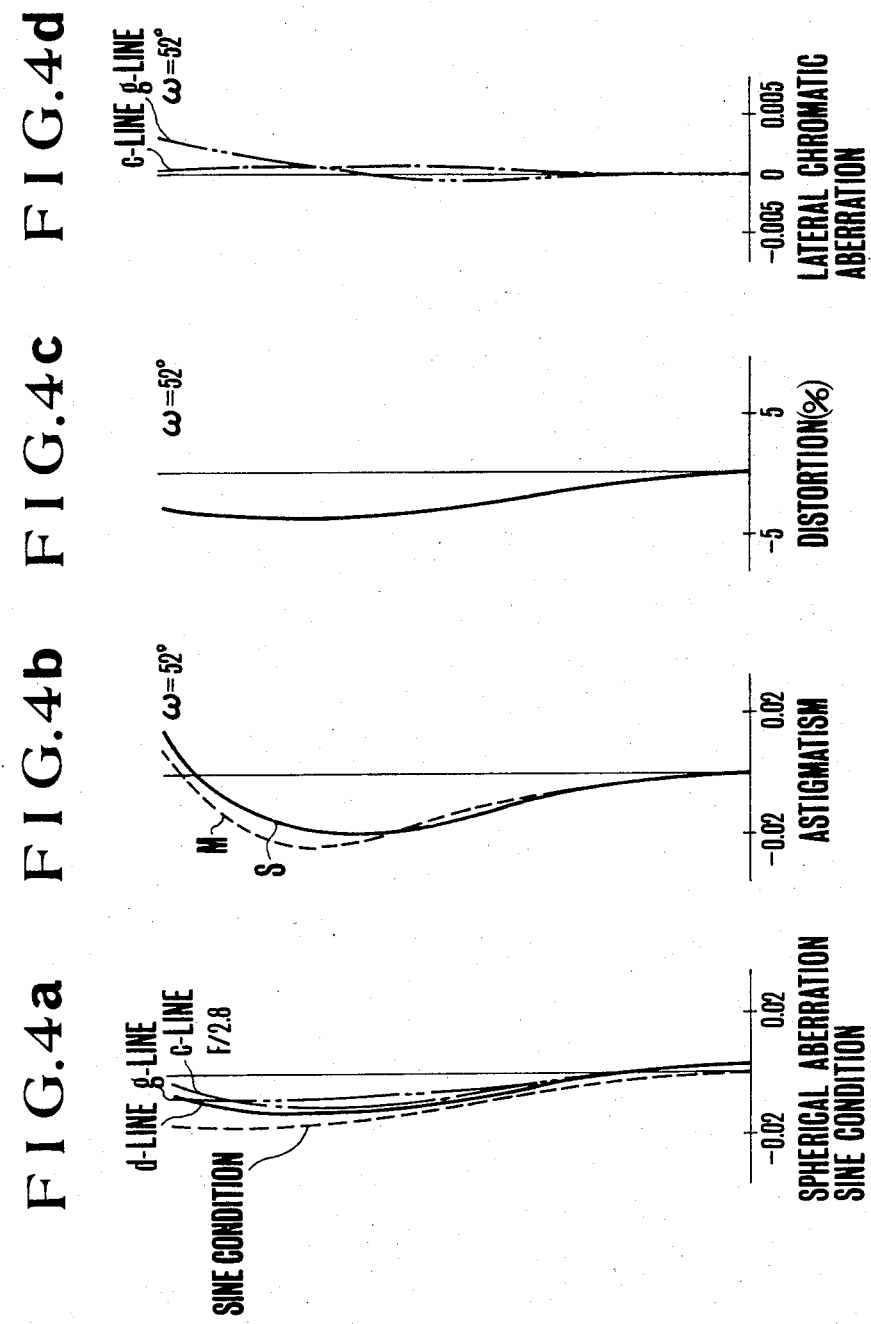

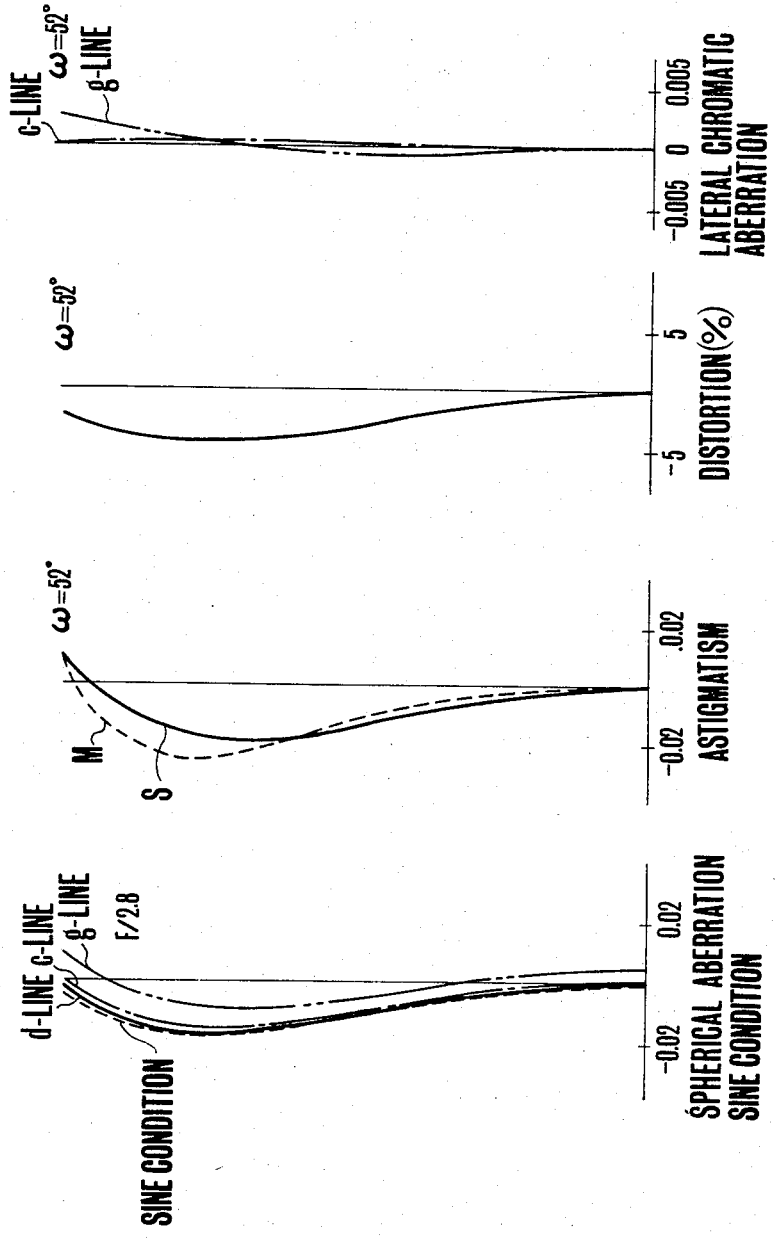

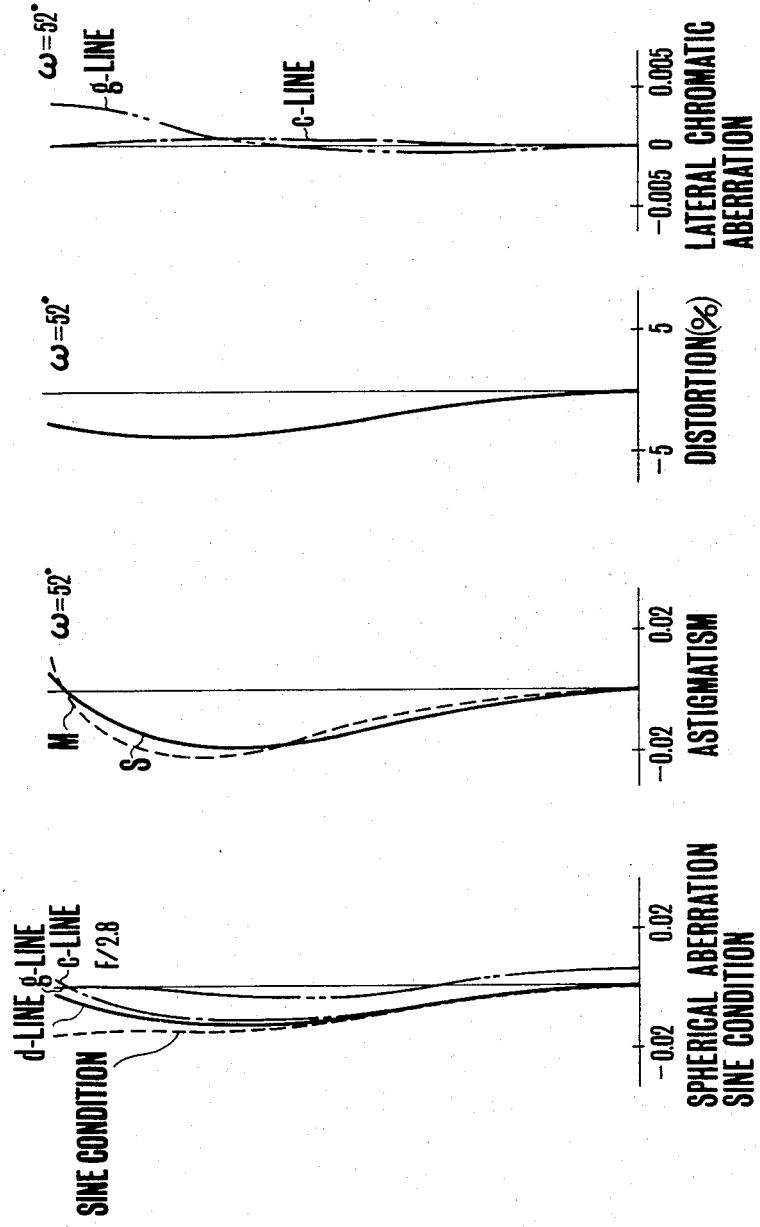

RETROFOCUS TYPE LARGE APERTURE WIDE ANGLE OBJECTIVE

BACKGROUND OF THE INVENTION

1. Field of the Invention

This invention relates to retrofocus type large aperture wide angle objectives, and more particularly to a compact retrofocus type wide angle objective having a field angle of 52° or thereabout with an F-number on the order of 2.8, and which is well corrected for aberrations.

2. Description of the Prior Art

In designing wide angle objectives for single lens relfex cameras, an increase in employment of compactness and large aperture ratio is occurring. Most of these wide angle objectives have been constructed in the form of an inverted telephoto type with the advantage that the back focal distance can be generally elongated. Since, on the other hand, the lens arrangement lacks symmetry, good correction of aberrations becomes difficult to perform. This difficulty tends to be intensified more and more as the field angle and the relative aperture are increased along with a further advance in the compactness of the entire system. It is known to provide a retrofocus type wide angle objective having an increased range with an increased relative aperture as, for example, in U.S. Pat. Nos. 3,748,021, 3,976,366, 3,981,563, 4,013,350, 4,061,421, and 4,188,092.

SUMMARY OF THE INVENTION

It is an object of the present invention to provide a retrofocus type wide angle objective for single lens reflex cameras having an increased range with an increased relative aperture while nevertheless permitting the various aberrations to be well corrected, and a further minimization of the bulk and size of the entire lens system to be made possible.

The retrofocus type large aperture wide angle objective of the invention has three lens groups, the first lens group counting from the front having a negative refractive power, the second lens group having a positive refractive power, and the third lens group having a positive refractive power. And, the first lens group has two positive lenses and three negative lenses. The second lens group has a cemented bi-convex lens. The third lens group has two cemented lenses and two positive lenses. A good state of correction of aberrations has been achieved by giving the configuration, refractive power, and material of lenses in each group and the total length of the lens system prescribed various conditions.

BRIEF DESCRIPTION OF THE DRAWINGS

FIGS. 4(a), (b), (c) and (d), 5(a), (b), (c) and (d), and 6(a), (b), (c) and (d) are graphic representations of the various aberrations of the objectives of FIGS. 1, 2 and 3 respectively.

DETAILED DESCRIPTION OF THE PREFERRED EMBODIMENTS

Figure 1:
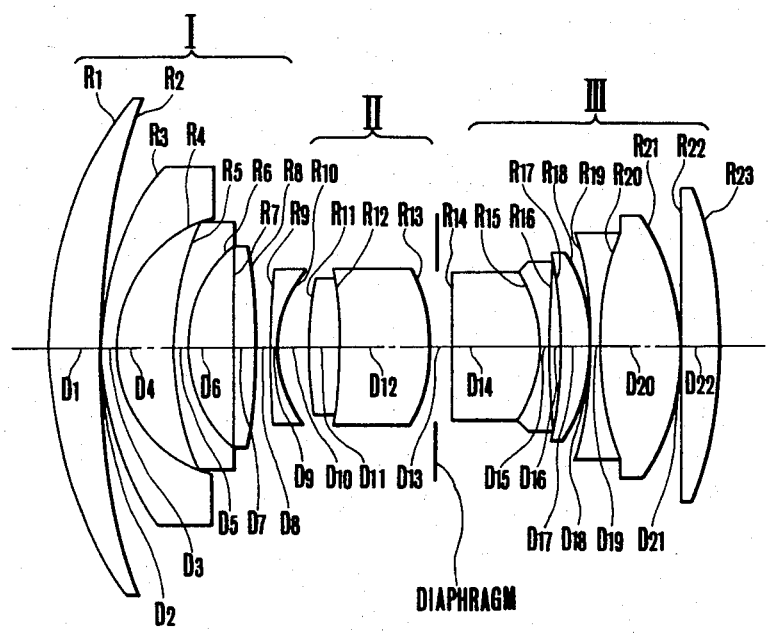
FIGS. 1, 2 and 3 are longitudinal sectional views of Examples 1, 2 and 3 of specific objectives according to the present invention respectively.
Figure 2:
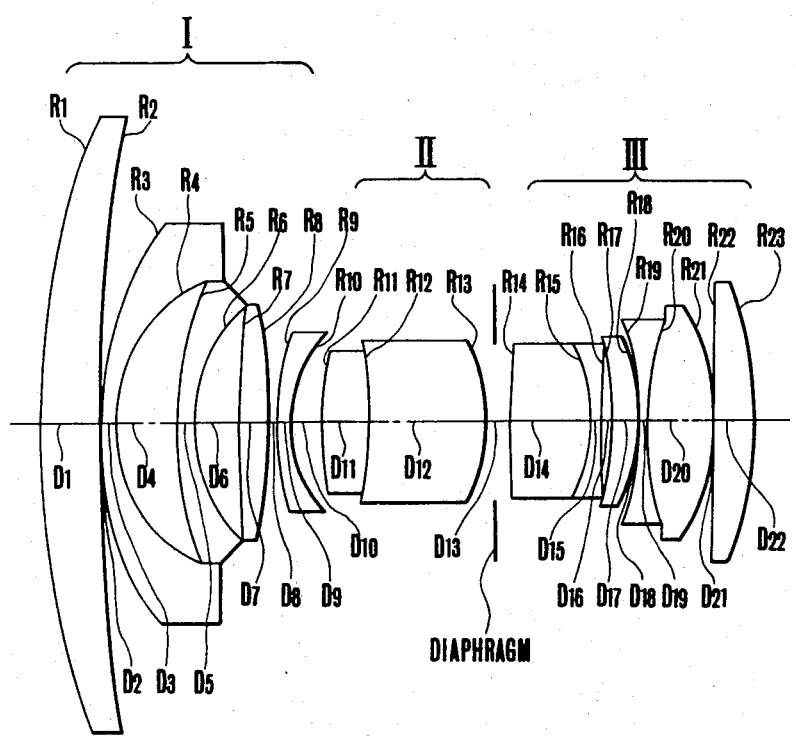
Figure 3:
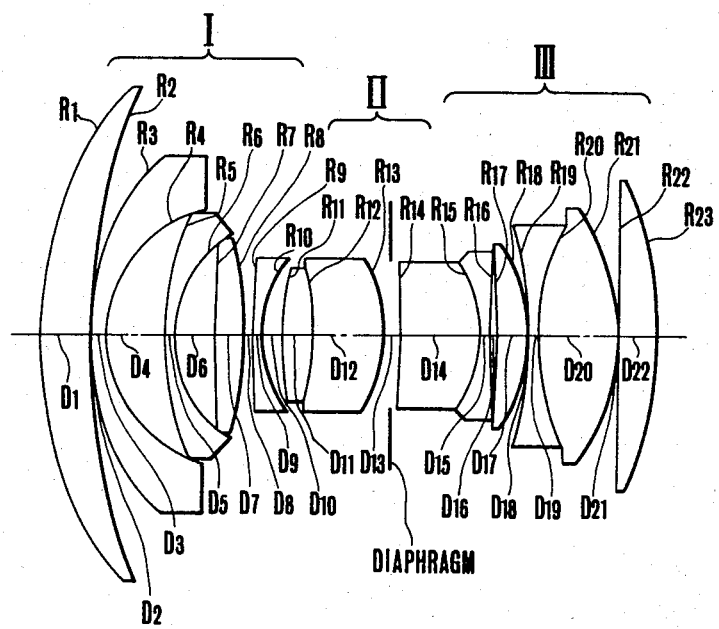

The present invention is next described in connection with embodiments thereof by reference to FIGS. 1, 2 and 3.

In these figures, the first lens group has a negative power, the second lens group has a positive refractive power, and the third lens group has a positive refractive power. And, the first lens group comprises, from front to rear, a positive meniscus lens of forward convexity, a negative meniscus lens of forward convexity, a negative meniscus lens of likewise or forward convexity, a positive lens, and a negative meniscus lens of forward convexity. The second lens group comprises a bi-convex doublet. The third lens group comprises, from front to rear, a doublet consisting of a positive lens and a negative lens cemented together, a positive meniscus lens of rearward convexity, a doublet consisting of a negative lens and a positive lens cemented together, and a positive lens. Positioned in the space between the second and third lens group is a diaphragm.

It is by such construction and arrangement that increases in the field angle and relative aperture and further an advance in the compactness of the lens system are achieved. For improvements of the imaging performance it is desirable to set forth the following conditions:

$$0.42 < |f_I| < 0.68, \text{ where } f_I < 0 \quad (1)$$

$$3.1 < \frac{D_T}{f} < 3.8 \quad (2)$$

$$1.3 < \frac{D_{I,II}}{D_{III}} < 1.9 \quad (3)$$

$$f_1 > f_4 \quad (4)$$

$$|f_2| > |f_3| > |f_5|, \text{ where } f_2, f_3, f_5 < 0 \quad (5)$$

$$1.73 < \frac{N_1 + N_3 + N_5}{3} \quad (6)$$

$$40 < \nu_1 < 65 \quad (7)$$
$$40 < \nu_4 < 65$$

$$0.7 < \frac{|R_{13}|}{f} < 0.9, \text{ where } R_{13} < 0 \quad (8)$$

$$40 < \nu_7 \quad (9)$$

$$25 < \nu_6 < 32 \quad (10)$$

$$0.15 < N_9 - N_8 \quad (11)$$

$$0.25 < N_{11} - N_{12} \quad (12)$$

$$0.6 < \frac{|R_{15}|}{f} < 1, \text{ where } R_{15} < 0 \quad (13)$$

$$1.3 < \frac{R_{20}}{f} < 1.65 \quad (14)$$

where
- $f$: the focal length of the entire system;
- $f_I$: the focal length of the 1st lens group;
- $D_T$: the total length of the objective;
- $D_{I,II}$: the length from the first surface of the 1st lens group to the last surface of the 2nd lens group;
- $D_{III}$: the length from the 1st surface of the 3rd lens group to the last surface;
- $f_1$ to $f_5$: the focal lengths of the 1st to 5th lenses counting from front in the first lens group respectively;
- $N_i$: the refractive index of the glass from which the i-th lens counting from front is made up;
- $\nu_i$: the Abbe number of the glass from which the i-th lens counting from front is made up; and $R_i$: the radius of curvature of the i-th lens surface counting from front.

Explanation about why these conditions are given is next made below.

Conditions (1), (2) and (3) determine a basic construction and arrangement of the present invention. Condition (1) is to relatively strengthen the negative refractive power of the 1st lens group so that a sufficiently long back focal distance in view of the lens for the single lens reflex camera is secured, and the diameter of the front lens member is maintained at a minimum. When the upper limit of condition (1) is exceeded, it becomes difficult to secure a sufficiently long back focal distance and to maintain the diameter of the front lens member at minimum. When the lower limit is exceeded, the 1st lens group produces large positive spherical aberrations including higher order ones so that an increase in the relative aperture is difficult to achieve. Condition (2) is to relatively shorten the total length of the objective with an advantage of achieving compactness. When the upper limit of this condition is exceeded, an advance in the compactness is difficult to achieve. When the lower limit is exceeded, overall aberration correction becomes difficult to perform. Condition (3) has, despite the arrangement of the diaphragm at a relatively far ahead position as compared with the conventional objective under condition (2), to maintain the diameter of the front lens member at a minimum. When the upper limit of this condition is exceeded, maintenance of the minimum diameter of the front member becomes difficult. When the lower limit is exceeded, the diameter of the rear lens members becomes large, and the 3rd lens group is caused to produce large off-axis aberrations which are difficult to compensate for.

Further, in the present invention, in order to achieve good correction of aberrations, all the lens groups are individually given the following features.

The feature of the 1st lens group is that this group is constructed with a positive lens, a negative lens, a negative lens a positive lens and a negative lens and is given conditions (4), (5), (6) and (7) within the framework of condition (1). Conditions (4) and (5) define the refractive powers of all the lenses so as to almost progressively lower the heights of incidence of an off-axis ray of light on the lens surfaces as it advances through the 1st lens group while being refracted by the successive lens elements. By these conditions it is made possible to refract the off-axis ray moderately with an advantage that while distortion is corrected, the various off-axis aberrations can be well corrected, and further correction of astigmatism and coma can be achieved. Condition (6) assists in weakening the curvatures of the negative lenses in the 1st lens group. By this, the axial thickness of the 1st lens group can be made thinner so that the diameter of the front lens member can be maintained at a minimum, and at the same time it is made possible to reduce the various off-axis aberrations produced by the negative lenses. Condition (7) represents the use of glasses of large Abbe numbers in making up the two positive lenses arranged in the 1st lens group, with the advantage that color distortion and color coma produced by the positive lenses are minimized. When the lower limits of this condition are exceeded, both of the color distortion and color coma are over-corrected. When the upper limits are exceeded, under-correction of lateral chromatic aberration results.

Conditions (8), (9) and (10) are concerned with the 2nd lens group. Condition (8) compensates for the over-correction of coma by the 1st group. When the upper limit of this condition is exceeded, the compensation of the over-correction becomes difficult. When the lower limit is exceeded, the R13 surface produces large negative spherical aberration, and an increase in the relative aperture becomes difficult to achieve. Condition (9) provides despite the configuration of the R13 surface to a strong convex curvature for preventing the production of color coma by that surface. When this condition is violated, large color coma is produced. Condition (10) provides despite conditions (7) and (9) for preventing an under-correction of lateral chromatic aberration from tending to result, and represents the use of a glass of small Abbe number in the positive lens constituting the front element of the cemented lens of the 2nd group. When the upper limit of this condition is exceeded, under-correction of lateral chromatic aberration results. When the lower limit is exceeded, under-correction of longitudinal chromatic aberration results.

On the other hand, the residual asymmetric aberrations can be compensated for by the diverging surfaces in the 3rd lens group. But when the diverging action is strengthened, higher order aberrations are produced and it becomes difficult to achieve an increase in the relative aperture. The characteristic feature of the 3rd lens group of the invention is that this group is made to comprise a cemented lens of a positive element and a negative element, a positive lens, a cemented lens of a negative element and a positive element, and a positive lens, and, while its physical length is relatively elongated under condition (3), it is provided with many diverging surfaces, satisfying conditions (11), (12), (13) and (14). Conditions (11) and (12) represent large differences between the refractive indices of the two elements in either of the cemented lenses and cooperate with conditions (13) and (14) to impart a large diverging action. When conditions (11) and (12) are violated, a sufficient diverging action cannot be obtained even under conditions (13) and (14) thereby making it difficult to correct asymmetric aberrations. Conditions (13) and (14) represent the optimum radii of curvature of the cemented surfaces under conditions (11) and (12). When the upper limits of these conditions are exceeded, asymmetric aberrations no longer can be well corrected. When the lower limits are exceeded, higher order aberrations are produced to make it difficult to increase the relative aperture.

It is noted that the specific embodiments which will be later described employ the focusing method of moving the entire lens system forward as the object distance is shortened, while simultaneously shortening the axial air separation between the surfaces R8 and R9 (corresponding to that designated by D8 in the drawings) to correct aberrations for the avoidance of lowering the imaging performance to an object at a shorter distance.

In the following, three examples of specific objectives of the invention satisfying the above-defined conditions are shown along with their numerical data, and 3rd order aberration coefficients of Example 1 objective are evaluated. Examples 1, 2 and 3 of the objective correspond to those shown in FIGS. 1, 2 and 3 respectively. In the tables of the numerical data, Ri is the radius of curvature of the i-th surface counting from the front, Di the i-th axial thickness of air separation, and Ni and $\nu i$ are the refractive index and Abbe number of the glass of the i-th lens element. Also in the table of the 3rd order aberration coefficient values, the surface numbers represent the lens surfaces numbered successively from the front, I denotes spherical aberration, II coma, III astigmatism, P Petzval sum and V distortion.

The various aberrations of the Example 1 objective are shown in FIG. 4, the various aberrations of the Example 2 objective in FIG. 5, and the various aberrations of the Example 3 objective in FIG. 6. In these figures, M denotes the meridional focus line, and S the sagittal focus line.

In the last table, there are shown the numerical relationships of the above-described various conditions set forth to achieve the retrofocus large aperture, wide angle objective of the invention with the three examples of specific objectives cited in the present invention. It will be understood from FIGS. 4, 5 and 6 that any of the three specific objectives satisfying the conditions has a good state of correction of aberrations.

EXAMPLE 1

| Focal Length F = 1, | | F-number: 2.8 | | Image Angle 2ω = 104° | | |
|---|---|---|---|---|---|---|
| $R_1$ | 2.1376 | $D_1$ | 0.2628 | $N_1$ | 1.58913 | $\nu_1$ 61.0 |
| $R_2$ | 3.9718 | $D_2$ | 0.0057 | | | |
| $R_3$ | 1.4701 | $D_3$ | 0.0857 | $N_2$ | 1.80610 | $\nu_2$ 40.9 |
| $R_4$ | 0.6970 | $D_4$ | 0.2943 | | | |
| $R_5$ | 1.6192 | $D_5$ | 0.0685 | $N_3$ | 1.79952 | $\nu_3$ 42.2 |
| $R_6$ | 0.7007 | $D_6$ | 0.2246 | | | |
| $R_7$ | 8.0445 | $D_7$ | 0.1371 | $N_4$ | 1.58913 | $\nu_4$ 61.0 |
| $R_8$ | −2.9543 | $D_8$ | 0.0744 | | | |
| $R_9$ | 3.6069 | $D_9$ | 0.0571 | $N_5$ | 1.77250 | $\nu_5$ 49.6 |
| $R_{10}$ | 0.7194 | $D_{10}$ | 0.1363 | | | |
| $R_{11}$ | 1.4963 | $D_{11}$ | 0.1714 | $N_6$ | 1.80518 | $\nu_6$ 25.4 |
| $R_{12}$ | −1.9753 | $D_{12}$ | 0.4726 | $N_7$ | 1.51633 | $\nu_7$ 64.1 |
| $R_{13}$ | −0.7925 | $D_{13}$ | 0.1143 | | | |
| $R_{14}$ | −9.4189 | $D_{14}$ | 0.4468 | $N_8$ | 1.51633 | $\nu_8$ 64.1 |
| $R_{15}$ | −0.7249 | $D_{15}$ | 0.0571 | $N_9$ | 1.75520 | $\nu_9$ 27.5 |
| $R_{16}$ | 9.9349 | $D_{16}$ | 0.0485 | | | |
| $R_{17}$ | −3.3072 | $D_{17}$ | 0.1485 | $N_{10}$ | 1.51633 | $\nu_{10}$ 64.1 |
| $R_{18}$ | −1.0001 | $D_{18}$ | 0.0057 | | | |
| $R_{19}$ | −2.5532 | $D_{19}$ | 0.0571 | $N_{11}$ | 1.88300 | $\nu_{11}$ 40.8 |
| $R_{20}$ | 1.5645 | $D_{20}$ | 0.4114 | $N_{12}$ | 1.51633 | $\nu_{12}$ 64.1 |
| $R_{21}$ | −1.1703 | $D_{21}$ | 0.0057 | | | |
| $R_{22}$ | 31.5042 | $D_{22}$ | 0.2114 | $N_{13}$ | 1.77250 | $\nu_{13}$ 49.6 |
| $R_{23}$ | −2.2160 | | | | | |

| Surface Number | 3rd Order Aberration Coefficient | | | | |
|---|---|---|---|---|---|
| | I | II | III | P | V |
| 1 | 0.0238 | 0.0265 | 0.0295 | 0.1734 | 0.2256 |
| 2 | 0.0002 | 0.0024 | 0.0217 | −0.0933 | −0.6446 |
| 3 | 0.0170 | 0.0202 | 0.0241 | 0.3035 | 0.3904 |
| 4 | −1.6941 | 0.2825 | −0.0471 | −0.6403 | 0.1146 |
| 5 | 0.5126 | 0.2169 | 0.0917 | 0.2743 | 0.1549 |
| 6 | −7.5986 | 0.5757 | −0.0436 | −0.6340 | 0.0513 |
| 7 | 1.3589 | 0.4711 | 0.1633 | 0.0460 | 0.0726 |
| 8 | −0.0279 | −0.0747 | −0.2001 | 0.1254 | −0.1998 |
| 9 | 1.0167 | 0.4481 | 0.1975 | 0.1208 | 0.1403 |
| 10 | −40.4814 | 0.0852 | −0.0001 | −0.6057 | 0.0012 |
| 11 | 26.3653 | 1.7845 | 0.1207 | 0.2980 | 0.0283 |
| 12 | −0.0120 | 0.0121 | −0.0122 | 0.0534 | −0.0414 |
| 13 | 17.7621 | −2.9106 | 0.4769 | 0.4296 | −0.1485 |
| 14 | −0.4175 | 0.2673 | −0.1712 | −0.0361 | 0.1327 |
| 15 | −8.3987 | 0.1991 | −0.0047 | −0.1237 | 0.0030 |
| 16 | −0.1083 | −0.1327 | −0.1627 | −0.0433 | −0.2525 |
| 17 | 0.0055 | −0.0106 | 0.0203 | −0.1029 | 0.1581 |
| 18 | 6.7959 | −0.4818 | 0.0341 | 0.3404 | −0.0265 |
| 19 | −1.2071 | 0.3593 | −0.1069 | −0.1836 | .0865 |
| 20 | −3.0323 | −1.1054 | −0.4030 | −0.0820 | −0.1768 |
| 21 | 4.6517 | −0.0111 | 0.0000 | 0.2909 | −0.0006 |
| 22 | −0.0067 | 0.0190 | −0.0541 | 0.0138 | 0.1144 |
| 23 | 7.1767 | 0.0795 | 0.0008 | 0.1966 | 0.0021 |
| Σ | 2.7020 | 0.1231 | −0.0248 | 0.1213 | 0.1855 |

EXAMPLE 2

| Focal Length: f = 1 | | F-number: 2.8 | | Image Angle 2ω = 104° | | |
|---|---|---|---|---|---|---|
| $R_1$ | 4.7267 | $D_1$ | 0.2859 | $N_1$ | 1.65844 | $\nu_1$ 50.9 |
| $R_2$ | 9.4579 | $D_2$ | 0.0057 | | | |
| $R_3$ | 1.7204 | $D_3$ | 0.0857 | $N_2$ | 1.71300 | $\nu_2$ 53.9 |
| $R_4$ | 0.8059 | $D_4$ | 0.3409 | | | |
| $R_5$ | 2.2325 | $D_5$ | 0.0686 | $N_3$ | 1.77250 | $\nu_3$ 49.6 |
| $R_6$ | 0.8596 | $D_6$ | 0.2231 | | | |
| $R_7$ | 4.8520 | $D_7$ | 0.1429 | $N_4$ | 1.68250 | $\nu_4$ 44.7 |
| $R_8$ | −4.1846 | $D_8$ | 0.0743 | | | |
| $R_9$ | 1.6920 | $D_9$ | 0.0571 | $N_5$ | 1.77250 | $\nu_5$ 49.6 |
| $R_{10}$ | 0.6736 | $D_{10}$ | 0.1781 | | | |
| $R_{11}$ | 2.0083 | $D_{11}$ | 0.2287 | $N_6$ | 1.69895 | $\nu_6$ 30.1 |
| $R_{12}$ | −2.5651 | $D_{12}$ | 0.6362 | $N_7$ | 1.58921 | $\nu_7$ 41.1 |
| $R_{13}$ | 0.8941 | $D_{13}$ | 0.1142 | | | |
| $R_{14}$ | 8.6300 | $D_{14}$ | 0.4174 | $N_8$ | 1.51633 | $\nu_8$ 64.1 |
| $R_{15}$ | −0.9149 | $D_{15}$ | 0.0571 | $N_9$ | 1.75520 | $\nu_9$ 27.5 |
| $R_{16}$ | 4.8257 | $D_{16}$ | 0.0457 | | | |
| $R_{17}$ | −2.7075 | $D_{17}$ | 0.1372 | $N_{10}$ | 1.51633 | $\nu_{10}$ 64.1 |
| $R_{18}$ | −1.2062 | $D_{18}$ | 0.0057 | | | |
| $R_{19}$ | −1.9853 | $D_{19}$ | 0.0571 | $N_{11}$ | 1.80610 | $\nu_{11}$ 40.9 |
| $R_{20}$ | 1.6297 | $D_{20}$ | 0.3545 | $N_{12}$ | 1.51633 | $\nu_{12}$ 64.1 |
| $R_{21}$ | −1.0958 | $D_{21}$ | 0.0057 | | | |
| $R_{22}$ | −58.3060 | $D_{22}$ | 0.1887 | $N_{13}$ | 1.77250 | $\nu_{13}$ 49.6 |
| $R_{23}$ | −2.0181 | | | | | |

EXAMPLE 3

| Focal Length: f = 1 | | F-Number: 2.8 | | Image Angle 2ω = 104° | | |
|---|---|---|---|---|---|---|
| $R_1$ | 1.9994 | $D_1$ | 0.2740 | $N_1$ | 1.61800 | $\nu_1$ 63.4 |
| $R_2$ | 3.6523 | $D_2$ | 0.0057 | | | |
| $R_3$ | 1.3438 | $D_3$ | 0.0742 | $N_2$ | 1.80610 | $\nu_2$ 40.9 |
| $R_4$ | 0.6159 | $D_4$ | 0.3006 | | | |
| $R_5$ | 1.6039 | $D_5$ | 0.0570 | $N_3$ | 1.80400 | $\nu_3$ 46.6 |
| $R_6$ | 0.6185 | $D_6$ | 0.2083 | | | |
| $R_7$ | 6.5542 | $D_7$ | 0.1370 | $N_4$ | 1.58913 | $\nu_4$ 61.0 |
| $R_8$ | −2.3202 | $D_8$ | 0.0570 | | | |
| $R_9$ | 5.1019 | $D_9$ | 0.0570 | $N_5$ | 1.80400 | $\nu_5$ 46.6 |
| $R_{10}$ | 0.7289 | $D_{10}$ | 0.0808 | | | |
| $R_{11}$ | 1.1996 | $D_{11}$ | 0.1712 | $N_6$ | 1.80518 | $\nu_6$ 25.4 |
| $R_{12}$ | −1.7084 | $D_{12}$ | 0.3835 | $N_7$ | 1.48749 | $\nu_7$ 70.1 |
| $R_{13}$ | −0.7172 | $D_{13}$ | 0.0855 | | | |
| $R_{14}$ | −5.0194 | $D_{14}$ | 0.4167 | $N_8$ | 1.58913 | $\nu_8$ 61.1 |
| $R_{15}$ | −0.6590 | $D_{15}$ | 0.0570 | $N_9$ | 1.75520 | $\nu_9$ 27.5 |
| $R_{16}$ | 24.4330 | $D_{16}$ | 0.0399 | | | |
| $R_{17}$ | −3.4649 | $D_{17}$ | 0.1484 | $N_{10}$ | 1.51633 | $\nu_{10}$ 64.1 |
| $R_{18}$ | −0.9369 | $D_{18}$ | 0.0057 | | | |
| $R_{19}$ | −2.4527 | $D_{19}$ | 0.0570 | $N_{11}$ | 1.88300 | $\nu_{11}$ 40.8 |
| $R_{20}$ | 1.3232 | $D_{20}$ | 0.4224 | $N_{12}$ | 1.48749 | $\nu_{12}$ 70.1 |
| $R_{21}$ | −1.1170 | $D_{21}$ | 0.0057 | | | |
| $R_{22}$ | −67.2607 | $D_{22}$ | 0.1884 | $N_{13}$ | 1.80400 | $\nu_{13}$ 46.6 |
| $R_{23}$ | −2.1609 | | | | | |

| Condition | Example 1 | Example 2 | Example 3 |
|---|---|---|---|
| (1) $0.42 < |f_I| < 0.68 \; f_I < 0$ | −0.5137 | −0.6576 | −0.4396 |
| (2) $3.1 < \dfrac{D_T}{f} < 3.8$ | 3.497 | 3.711 | 3.233 |

-continued

| Condition | Example 1 | Example 2 | Example 3 |
|---|---|---|---|
| (3) $1.3 < \dfrac{D_{I\,II}}{D_{III}} < 1.9$ | 1.423 | 1.834 | 1.347 |
| (4) $f_1 > f_4$ | $7.461 > 3.685$ | $14.014 > 3.313$ | $6.723 > 2.925$ |
| (5) $|f_2| > |f_3| > |f_5|$ $f_2, f_3, f_5 < 0$ | $f_2 \; -1.730$ $f_3 \; -1.598$ $f_5 \; -1.173$ | $-2.213$ $-1.850$ $-1.485$ | $-1.478$ $-1.285$ $-1.064$ |
| (6) $1.73 < \dfrac{N_1 + N_3 + N_5}{3}$ | 1.7927 | 1.7527 | 1.8047 |
| (7) $40 < V_1, V_4 < 65$ | 61, 61 | 50.9, 44.7 | 63.4, 61 |
| (8) $0.7 < \dfrac{|R_{13}|}{f} < 0.9 \; R_{13} < 0$ | $-0.7925$ | $-0.8941$ | $-0.7173$ |
| (9) $40 < V_7$ | 64.1 | 41.1 | 70.1 |
| (10) $25 < V_6 < 32$ | 25.4 | 30.1 | 25.4 |
| (11) $0.15 < N_9 - N_8$ | 0.2389 | 0.2389 | 0.1661 |
| (12) $0.25 < N_{11} - N_{12}$ | 0.3667 | 0.28977 | 0.3955 |
| (13) $0.6 < \dfrac{|R_{15}|}{f} < 1. \; R_{15} < 0$ | $-0.7249$ | $-0.9149$ | $-0.6590$ |
| (14) $1.3 < \dfrac{R_{20}}{f} < 1.65$ | 1.5645 | 1.6297 | 1.3232 |

What is claimed is:

1. A large relative aperture, wide angle objective lens of the retrofocus type including, successively in the direction from front to rear, first, second and third lens groups, of which the first lens group has a negative refractive power and comprises, from front to rear, a positive meniscus lens convex toward the front, a negative meniscus lens convex toward the front, a negative meniscus lens convex toward the front, a positive lens and a negative meniscus lens convex toward the front, the second lens group has a positive refractive power and comprises a cemented bi-convex lens, and the third lens group has a positive refractive power and comprises, from front to rear, a cemented lens of a positive element and a negative element, a positive meniscus lens convex toward the rear, a cemented lens of a negative element and a positive element, and a positive lens, and a diaphragm positioned in a space between the second and third lens groups.

2. A large relative aperture wide angle objective lens according to claim 1, which satisfies the following conditions:

$$0.42 < |f_I| < 0.68 \text{ where } f_I < 0 \quad (1)$$

$$3.1 < \frac{D_T}{f} < 3.8 \quad (2)$$

$$1.3 < \frac{D_{I\,II}}{D_{III}} < 1.9 \quad (3)$$

wherein
  f: the focal length of the entire system;
  $f_I$: the focal length of the 1st lens group;
  $D_T$: the total length of the objective;
  $D_{I\,II}$: the length from the 1st surface of the 1st lens group to the last surface of the 2nd lens group;
  $D_{III}$: the length from the 1st surface of the 3rd lens group to the last surface.

3. A large relative aperture wide angle objective lens according to claim 2, which satisfies the following conditions:

$$f_1 < f_4 \quad (4)$$

$$|f_2| > |f_3| > |f_5| \text{ where } f_2, f_3, f_5 < 0 \quad (5)$$

$$1.73 < \frac{N_1 + N_3 + N_5}{3} \quad (6)$$

$$40 < \nu_1 < 65 \quad (7)$$
$$40 < \nu_4 < 65$$

$$0.7 < \frac{|R_{13}|}{f} < 0.9 \text{ where } R_{13} < 0 \quad (8)$$

$$40 < \nu_7 \quad (9)$$

$$25 < \nu_6 < 32 \quad (10)$$

wherein
  $f_1$: the focal length of the 1st lens counting from the front arranged in the 1st lens group;
  $f_2$: the focal length of the 2nd lens in the 1st lens group;
  $f_3$: the focal length of the 3rd lens in the 1st lens group;
  $f_4$: the focal length of the 4th lens in the 1st lens group;
  $f_5$: the focal length of the 5th lens in the 1st lens group;
  $N_i$: the refractive index of the glass of the i-th lens counting from the front;
  $\nu_i$: the Abbe number of the glass of the i-th lens counting from the front; and
  $R_i$: the radius of curvature of the i-th lens surface counting from the front.

4. A large relative aperture wide angle objective lens according to claim 2, which satisfies the following conditions:

$$0.15 < N_9 - N_8 \quad (11)$$

$$0.25 < N_{11} - N_{12} \quad (12)$$

$$0.6 < \frac{|R_{15}|}{f} < 1 \text{ where } R_{15} < 0 \quad (13)$$

$$1.3 < \frac{R_{20}}{f} < 1.65 \quad (14)$$

wherein $N_i$: the refractive index of the glass of the i-th lens counting from the front;

$\nu_i$: the Abbe number of the glass of the i-th lens counting from the front; and $R_i$: the radius of curvature of the i-th lens surface counting from the front.

5. A large relative aperture, wide angle objective lens of the retrofocus type including first, second and third lens groups, of which the first has a negative refractive power and comprises, from front to rear, a positive meniscus lens convex toward the front, a negative meniscus lens convex toward the front, a negative meniscus lens convex toward the front, a positive lens and a negative meniscus lens convex toward the front, the second has a positive refractive power and comprises a cemented bi-convex lens, and the third has a positive refractive power and comprises, from front to rear, a cemented lens of a positive element and a negative element, a positive meniscus lens convex toward the rear, a cemented lens of a negative element and a positive element, and a positive lens, and a diaphragm positioned in a space between the 2nd and 3rd lens groups, said objective satisfying the following conditions:

$$0.42 < |f_I| < 0.68 \text{ where } f_I < 0 \quad (1)$$

$$3.1 < \frac{D_T}{f} < 3.8 \quad (2)$$

$$1.3 < \frac{D_{I\,II}}{D_{III}} < 1.9 \quad (3)$$

$$f_1 > f_4 \quad (4)$$

$$|f_2| > |f_3| > |f_5| \text{ where } f_2, f_3, f_5 < 0 \quad (5)$$

$$1.73 < \frac{N_1 + N_3 + N_5}{3} \quad (6)$$

$$40 < \nu_1 < 65 \quad (7)$$
$$40 < \nu_4 < 65$$

$$0.7 < \frac{|R_{13}|}{f} < 0.9 \text{ where } R_{13} < 0 \quad (8)$$

$$40 < \nu_7 \quad (9)$$

$$25 < \nu_6 < 32 \quad (10)$$

$$0.15 < N_9 - N_8 \quad (11)$$

$$0.25 < N_{11} - N_{12} \quad (12)$$

$$0.6 < \frac{|R_{15}|}{f} < 1 \text{ where } R_{15} < 0 \quad (13)$$

$$1.3 < \frac{R_{20}}{f} < 1.65 \quad (14)$$

wherein f: the focal length of the entire system;

$f_I$: the focal length of the 1st lens group;

$D_T$: the total length of the objective;

$D_{I\,II}$: the length from the 1st surface of the 1st lens group to the last surface of the 2nd lens group;

$D_{III}$: the length from the 1st surface of the 3rd lens group to the last surface;

$f_1$: the focal length of the 1st lens counting from the front arranged in the 1st lens group;

$f_2$: the focal length of the 2nd lens in the 1st lens group;

$f_3$: the focal length of the 3rd lens in the 1st lens group;

$f_4$: the focal length of the 4th lens in the 1st lens group;

$f_5$: the focal length of the 5th lens in the 1st lens group;

$N_i$: the refractive index of the glass of the i-th lens counting from the front;

$\nu_i$: the Abbe number of the glass of the i-th lens counting from the front; and $R_i$: the radius of curvature of the i-th lens surface counting from the front.

* * * * *